US010460608B2

(12) United States Patent
Borgyos et al.

(10) Patent No.: US 10,460,608 B2
(45) Date of Patent: Oct. 29, 2019

(54) SYSTEM AND METHOD FOR DETERMINING UNCERTAINTY IN A PREDICTED FLIGHT PATH FOR AN AERIAL VEHICLE

(71) Applicant: GE Aviation Systems LLC, Grand Rapids, MI (US)

(72) Inventors: Szabolcs Andras Borgyos, Wyoming, MI (US); Joachim Karl Ulf Hochwarth, Caledonia, MI (US)

(73) Assignee: GE Aviation Systems LLC, Grand Rapids, MI (US)

( * ) Notice: Subject to any disclaimer, the term of this patent is extended or adjusted under 35 U.S.C. 154(b) by 0 days.

(21) Appl. No.: 15/605,008

(22) Filed: May 25, 2017

(65) Prior Publication Data

US 2018/0342166 A1    Nov. 29, 2018

(51) Int. Cl.
| | | |
|---|---|---|
| *G08G 5/00* | (2006.01) | |
| *B64D 43/00* | (2006.01) | |
| *G01C 21/20* | (2006.01) | |
| *G01C 23/00* | (2006.01) | |

(52) U.S. Cl.
CPC ............. *G08G 5/003* (2013.01); *G01C 21/20* (2013.01); *G01C 23/00* (2013.01); *G08G 5/0021* (2013.01); *G08G 5/0052* (2013.01); *G08G 5/0091* (2013.01); *B64D 43/00* (2013.01); *G08G 5/0039* (2013.01)

(58) Field of Classification Search
None
See application file for complete search history.

(56) References Cited

U.S. PATENT DOCUMENTS

| | | | |
|---|---|---|---|
| 8,150,588 B2 | 4/2012 | Klooster | |
| 8,200,377 B2 | 6/2012 | Marty et al. | |
| 8,560,148 B2 | 10/2013 | Torres et al. | |
| 8,788,189 B2 | 7/2014 | Polansky et al. | |
| 8,924,137 B2 | 12/2014 | Chan et al. | |
| 8,965,672 B2 | 2/2015 | Sawhill et al. | |
| 8,989,923 B2 * | 3/2015 | De Prins | G01C 23/005 |
| | | | 244/194 |
| 9,098,997 B2 * | 8/2015 | Stewart | G08G 5/003 |
| 2006/0089760 A1 * | 4/2006 | Love | G08G 5/0039 |
| | | | 701/4 |

(Continued)

OTHER PUBLICATIONS

Extended European Search Report and Opinion issued in connection with corresponding EP Application No. 18173394.0 dated Oct. 18, 2018.

*Primary Examiner* — Rami Khatib
(74) *Attorney, Agent, or Firm* — Dority & Manning, P.A.

(57) ABSTRACT

A method for determining uncertainty in a predicted flight path for an aerial vehicle can include determining, by one or more computing devices, uncertainty in a performance model of the aerial vehicle. The method can further include determining, by one or more computing devices, uncertainty in a weather model indicative of weather conditions along the predicted flight path. In addition, the method can include determining, by the one or more computing devices, uncertainty in the predicted flight path based on the uncertainty in the performance model and the uncertainty in the weather model. The method can further include generating, by one or more computing devices, a notification indicating the uncertainty in the predicted flight path.

20 Claims, 7 Drawing Sheets

(56) References Cited

U.S. PATENT DOCUMENTS

| | | | |
|---|---|---|---|
| 2009/0012660 A1* | 1/2009 | Roberts | G08G 5/0013 |
| | | | 701/3 |
| 2010/0100308 A1* | 4/2010 | Coulmeau | G08G 5/006 |
| | | | 701/122 |
| 2012/0116614 A1 | 5/2012 | Torres et al. | |
| 2013/0124076 A1 | 5/2013 | Bruni et al. | |
| 2014/0088799 A1 | 3/2014 | Tino et al. | |
| 2014/0277853 A1* | 9/2014 | Castillo-Effen | G08G 5/0095 |
| | | | 701/3 |
| 2016/0125740 A1* | 5/2016 | Pasko | G08G 5/0034 |
| | | | 701/528 |
| 2016/0343258 A1 | 11/2016 | Navarro et al. | |
| 2017/0132938 A1 | 5/2017 | Lax et al. | |

\* cited by examiner

SYSTEM AND METHOD FOR DETERMINING UNCERTAINTY IN A PREDICTED FLIGHT PATH FOR AN AERIAL VEHICLE

FIELD

The present subject matter relates generally to flight path trajectories for aerial vehicles.

BACKGROUND

A flight for an aerial vehicle begins with the filing of a flight plan that outlines the route for the flight. In particular, the flight plan can include an origination and destination location and times as well as intermediate routing information that define an airway or flight path. Airways can be considered three-dimensional highways and can be defined with a set of intermediate waypoints. The set of intermediate waypoints can be considered reference locations in physical space. As such, the set of intermediate waypoints can be used for purposes of navigation and typically include a latitude, longitude and altitude. While navigating a flight plan, the aerial vehicle flies a path or trajectory that traverses the set of waypoints in a sequenced order in time. Hence, the flight path actually flown by the aerial vehicle is referred to as a four-dimensional trajectory having three spatial coordinates and one temporal coordinate.

As civil aviation authorities, such as the FAA, strive for better airspace efficiency, four-dimensional trajectories are becoming increasingly important. However, the four-dimensional trajectories generated by a flight management system of the aerial vehicle are subject to a number of uncertainties (e.g., weather conditions). As such, trajectory based operations (TBO) in which flight clearances are based on trajectories cannot accurately rely upon four-dimensional trajectories computed by the flight management system.

BRIEF DESCRIPTION

Aspects and advantages of the present disclosure will be set forth in part in the following description, or may be obvious from the description, or may be learned through practice of the present disclosure.

In an example embodiment, a method for determining uncertainty in a predicted flight path for an aerial vehicle can include determining, by one or more computing devices, uncertainty in a performance model of the aerial vehicle. The method can include determining, by one or more computing devices, uncertainty in a weather model indicative of weather conditions along the predicted flight path. In addition, the method can include determining, by the one or more computing devices, uncertainty in the predicted flight path based on the uncertainty in the performance model and the uncertainty in the weather model. The method can further include generating, by one or more computing devices, a notification indicating the uncertainty in the predicted flight path.

In another example embodiment, a system for determining uncertainty in a predicted flight path for an aerial vehicle can include a memory device and one or more computing devices. The one or more computing devices can be configured to determine uncertainty in a performance model of the aerial vehicle. The one or more computing devices can be further configured to determine uncertainty in a weather model indicative of weather conditions along the predicted flight path. In addition, the one or more computing devices can be configured to determine uncertainty in the predicted flight path based on the uncertainty in the performance model and the uncertainty in the weather model. The one or more computing devices can be further configured to generate a notification indicative of the uncertainty in the predicted flight path trajectory.

In yet another example embodiment, an aerial vehicle can include a memory device and one or more computing devices. The one or more computing devices can be configured to determine uncertainty in a performance model of the aerial vehicle. The one or more computing devices can be further configured to determine uncertainty in a weather model indicative of weather conditions along the predicted flight path. In addition, the one or more computing devices can be configured to determine uncertainty in the predicted flight path based on the uncertainty in the performance model and the uncertainty in the weather model. The one or more computing devices can be further configured to generate a notification indicative of the uncertainty in the predicted flight path trajectory.

These and other features, aspects and advantages of the present disclosure will become better understood with reference to the following description and appended claims. The accompanying drawings, which are incorporated in and constitute a part of this specification, illustrate embodiments of the present disclosure and, together with the description, serve to explain the principles of the present disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended Figs., in which.

DETAILED DESCRIPTION

Figure 1:
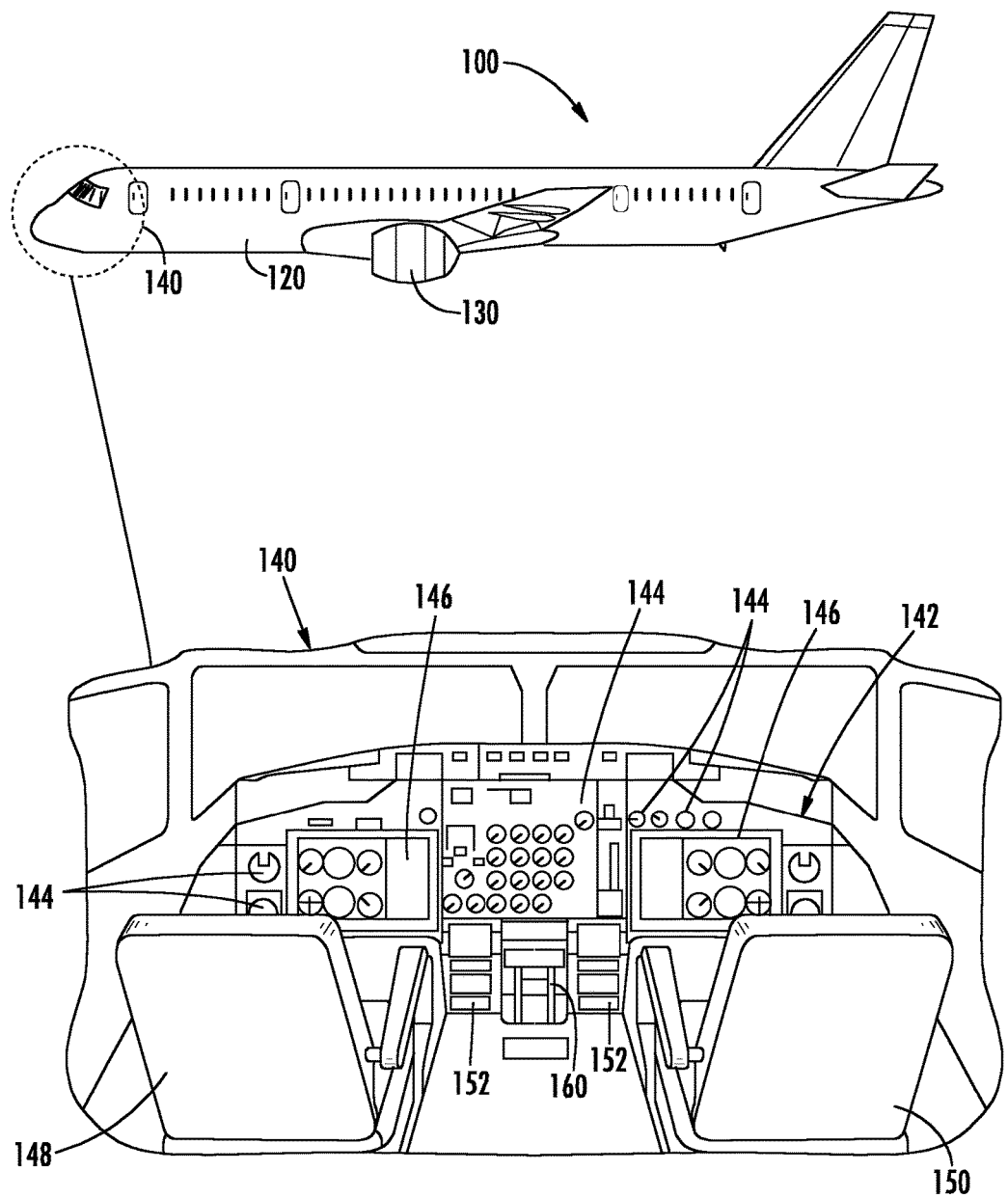
FIG. 1 illustrates an aerial vehicle according to example embodiments of the present disclosure.

Reference will now be made in detail to present embodiments of the present disclosure, one or more examples of which are illustrated in the accompanying drawings. The detailed description uses numerical and letter designations to refer to features in the drawings.

As used herein, the terms "first" and "second" can be used interchangeably to distinguish one component from another and are not intended to signify location or importance of the individual components. The singular forms "a", "an", and "the" include plural references unless the context clearly dictates otherwise.

An aerial vehicle can include a flight management system comprising a flight management computer. The flight management computer can be configured to generate a predicted flight path for the aerial vehicle. In particular, the predicted flight path can include two or more waypoints. In example embodiments, the predicted flight path 400 can be a four-dimensional trajectory comprising a spatial component and a temporal component. The spatial component can indicate a position of the aerial vehicle within a three-dimensional coordinate system. The temporal component of the four-dimensional trajectory can indicate when the aerial vehicle 100 can be expected to cross each of the waypoints. In this way, proximity of the aerial vehicle to one or more waypoints can be determined.

The flight management computer can generate the predicted flight path based, at least in part, on one or more intrinsic factors (e.g., modeled parameters indicative of performance of the aerial vehicle) and one or more extrinsic factors (e.g., predicted weather conditions). However, uncertainties in the intrinsic factor(s), the extrinsic factor(s), or both can cause uncertainty in the predicted flight path. The uncertainty in the predicted flight path means the aerial vehicle can deviate from the predicted flight path. This is undesirable, especially when one or more aerial vehicles are operating within close proximity of the predicted flight path. As will be discussed below in more detail, the flight management computer can be configured to determine the uncertainty in the predicted flight path.

In example embodiments, the flight management computer can be configured to determine uncertainty in a current position of the aerial vehicle relative to the predicted flight path. In other words, how much, if any, the current position of the aerial vehicle deviates from the predicted flight path. Alternatively or additionally, the flight management computer can be configured to determine uncertainty in a future position of the aerial vehicle relative to the predicted flight path. In other words, how much, if any, the future position of the aerial vehicle deviates from the predicted flight path. It should be appreciated that the uncertainty in the predicted flight path increases as a function of time. As such, the uncertainty in the future position of the aerial vehicle relative to the predicted flight path must be greater than the uncertainty in the current position of the aerial vehicle relative to the predicted flight path.

The flight management computer can be configured to generate a confidence score indicative of the uncertainty in the predicted flight path. For example, the confidence score can quantify the uncertainty in the current position of the aerial vehicle relative to the predicted flight path. Alternatively or additionally, the confidence score can quantify the uncertainty in the future position of the aerial vehicle relative to predicted flight path.

The flight management computer can be further configured to transmit the confidence score to one or more computing devices located at a ground station, such as an air traffic control (ATC) tower. The computing device(s) can use the confidence score to determine whether the aerial vehicle is at risk of interfering with a predicted flight path for one or more aerial vehicles operating within a predetermined proximity of the aerial vehicle. In this way, management of air traffic in and around an airport can be improved.

The systems and methods according to example aspects of the present disclosure can have a number of technical effects and benefits. For instance, decision support tools relying on the predicted flight path generated by the flight management computer can more accurately detect conflicts between predicted flight paths for two or more aerial vehicles. In addition, decision support tools can optimize arrivals and departure rates at airports.

FIG. 1 depicts an aerial vehicle 100 according to example embodiments of the present disclosure. As shown, the aerial vehicle 100 can include a fuselage 120, one or more engine(s) 130, and a cockpit 140. In example embodiments, the cockpit 140 can include a flight deck 142 having various instruments 144 and flight displays 146. It should be appreciated that instruments 144 can include, without limitation, a dial, gauge, or any other suitable analog device.

A first user (e.g., a pilot) can be present in a seat 148 and a second user (e.g., a co-pilot) can be present in a seat 150. The flight deck 142 can be located in front of the pilot and co-pilot and may provide the flight crew (e.g., pilot and co-pilot) with information to aid in operating the aerial vehicle 100. The flight displays 146 can include primary flight displays (PFDs), multi-purpose control display units (MCDUs), navigation display (ND), or any suitable combination. During operation of the aerial vehicle 100, both the instruments 144 and flight displays 146 can display a wide range of vehicle, flight, navigation, and other information used in the operation and control of the aerial vehicle 100.

The instruments 144 and flight displays 146 may be laid out in any manner including having fewer or more instruments or displays. Further, the flight displays 146 need not be coplanar and need not be the same size. A touch screen display or touch screen surface (not shown) may be included in the flight displays 146 and may be used by one or more flight crew members, including the pilot and co-pilot, to interact with the aerial vehicle 100. The touch screen surface may take any suitable form including that of a liquid crystal display (LCD) and may use various physical or electrical attributes to sense inputs from the flight crew. It is contemplated that the flight displays 146 can be dynamic and that one or more cursor control devices (not shown) and/or one or more multifunction keyboards 152 can be included in the cockpit 140 and may be used by one or more flight crew members to interact with systems of the aerial vehicle 100. In this manner, the flight deck 142 may be considered a user interface between the flight crew and the aerial vehicle 100.

Additionally, the cockpit 140 can include an operator manipulated input device 160 that allow members of the flight crew to control operation of the aerial vehicle 100. In one example embodiment, the operator manipulated input device 160 can be used to control the engine power of the one or more engines 130. More specifically, the operator manipulated input device 160 can include a lever having a handle, and the lever can be movable between a first position and a second position. As such, a flight crew member can move the lever between the first and second positions to control the engine power of the one or more engine(s) 130. It should be appreciated that the pilot can move the lever to one of a plurality of intermediate third positions disposed between the first position and the second position.

The numbers, locations, and/or orientations of the components of example aerial vehicle 100 are for purposes of illustration and discussion and are not intended to be limiting. As such, those of ordinary skill in the art, using the disclosures provided herein, shall understand that the numbers, locations, and/or orientations of the components of the aerial vehicle 100 can be adjusted without deviating from the scope of the present disclosure.

Figure 2:
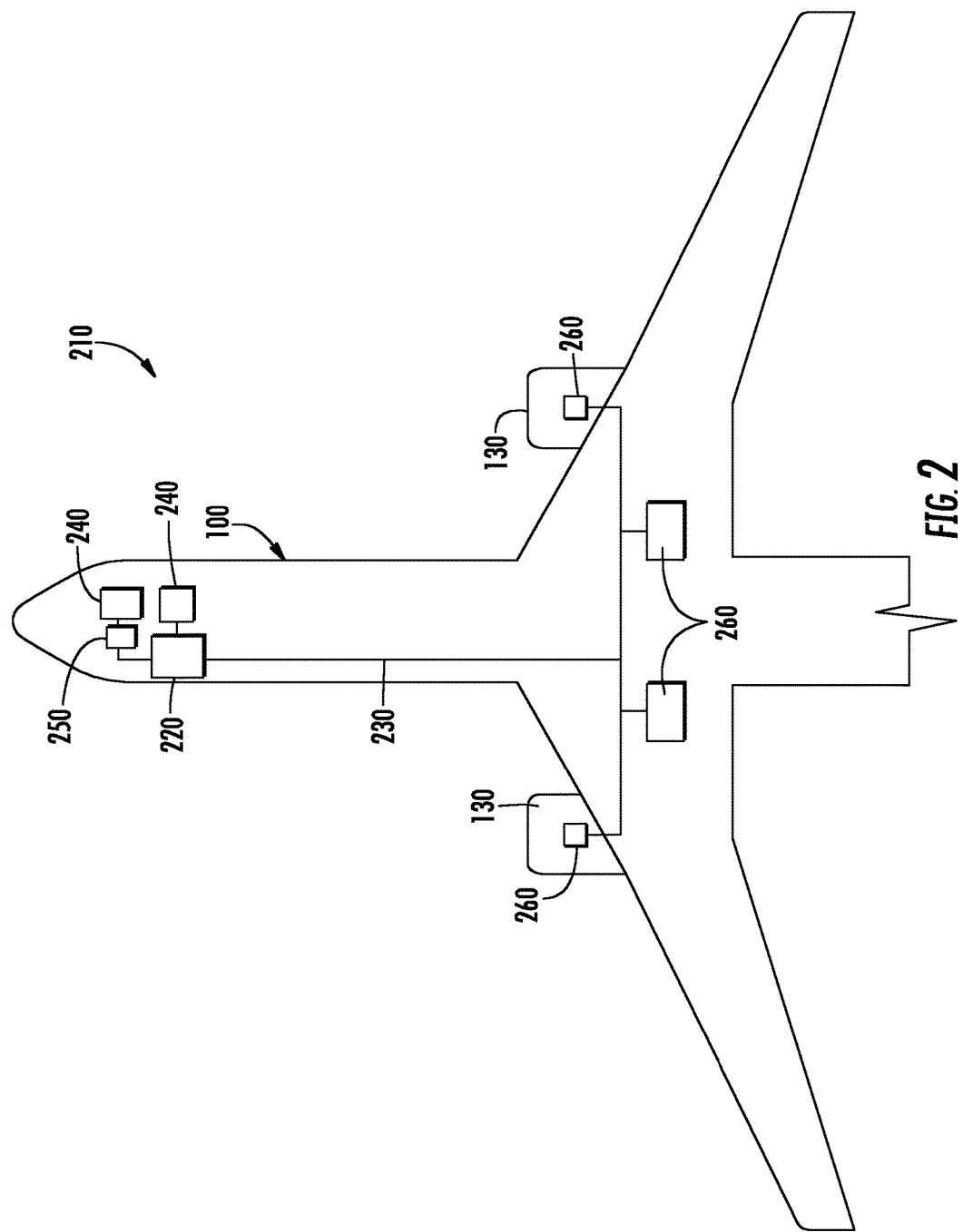
FIG. 2 illustrates a computing system for an aerial vehicle according to example embodiments of the present disclosure.

Referring now to FIG. 2, the aerial vehicle 100 can include an onboard computing system 210. As shown, the onboard computing system 210 can include one or more onboard computing device(s) 220 that can be associated with, for instance, an avionics system. In example embodiments, one or more of the onboard computing device(s) 220 can include a flight management system (FMS). Alternatively or additionally, the one or more onboard computing device(s) 220 can be coupled to a variety of systems on the aerial vehicle 100 over a communications network 230. The communications network 230 can include a data bus or combination of wired and/or wireless communication links.

In example embodiments, the onboard computing device(s) 220 can be in communication with a display system 240, such as the flight displays 146 (FIG. 1) of the aerial vehicle 100. More specifically, the display system 240 can include one or more display device(s) configured to display or otherwise provide information generated or received by the onboard computing system 210. In example embodiments, information generated or received by the onboard computing system 210 can be displayed on the one or more display device(s) for viewing by flight crew members of the aerial vehicle 102. The display system 240 can include a primary flight display, a multipurpose control display unit, or other suitable flight displays commonly included within the cockpit 140 (FIG. 1) of the aerial vehicle 100.

The onboard computing device(s) 220 can also be in communication with a flight management computer 250. In example embodiments, the flight management computer 250 can automate the tasks of piloting and tracking the flight plan of the aerial vehicle 100. It should be appreciated that the flight management computer 250 can include or be associated with any suitable number of individual microprocessors, power supplies, storage devices, interface cards, auto flight systems, flight management computers, the flight management system (FMS) and other standard components. The flight management computer 250 can include or cooperate with any number of software programs (e.g., flight management programs) or instructions designed to carry out the various methods, process tasks, calculations, and control/display functions necessary for operation of the aerial vehicle 100. The flight management computer 250 is illustrated as being separate from the onboard computing device(s) 220. However, those of ordinary skill in the art, using the disclosures provided herein, will understand that the flight management computer 250 can also be included with or implemented by the onboard computing device(s) 220.

The onboard computing device(s) 220 can also be in communication with one or more aerial vehicle control system(s) 260. The aerial vehicle control system(s) 260 can be configured to perform various aerial vehicle operations and control various settings and parameters associated with the aerial vehicle 100. For instance, the aerial vehicle control system(s) 260 can be associated with one or more engine(s) 130 and/or other components of the aerial vehicle 100. The aerial vehicle control system(s) 260 can include, for instance, digital control systems, throttle systems, inertial reference systems, flight instrument systems, engine control systems, auxiliary power systems, fuel monitoring systems, engine vibration monitoring systems, communications systems, flap control systems, flight data acquisition systems, a flight management system (FMS), and other systems.

Figure 3:
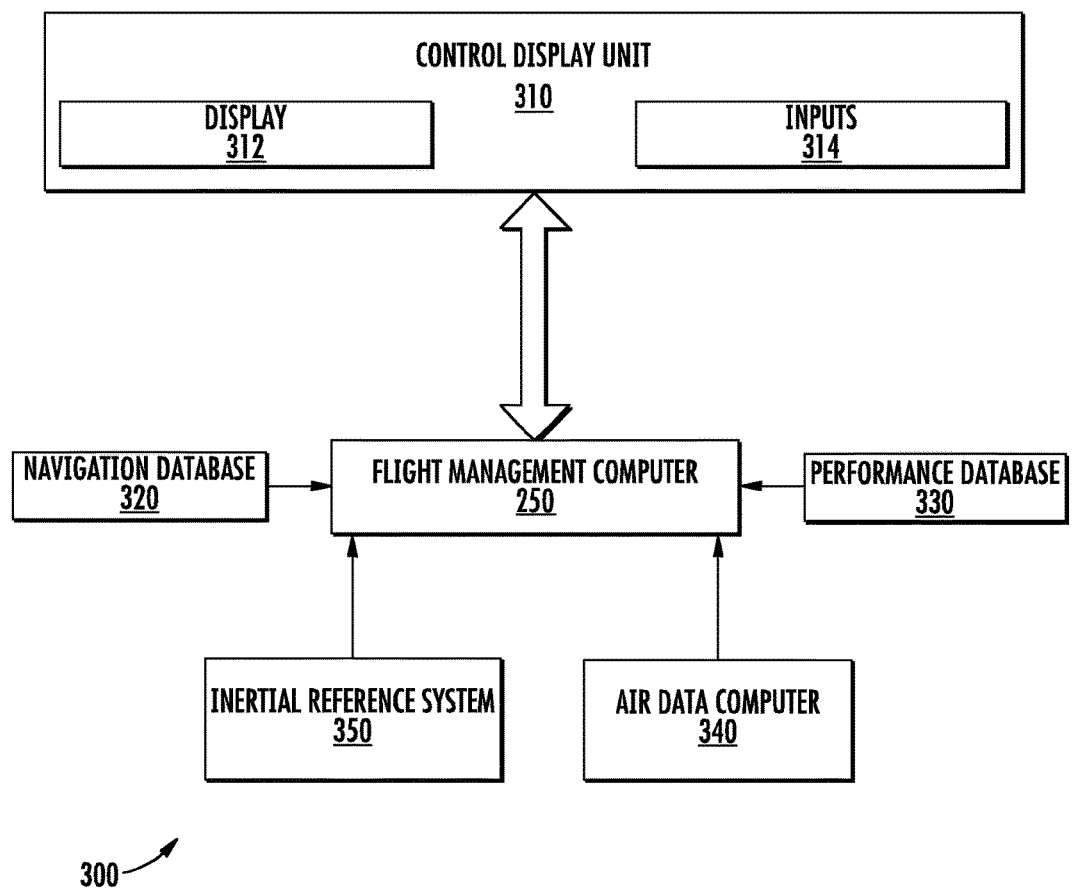
FIG. 3 illustrates an flight management system for an aerial vehicle according to example embodiments of the present disclosure.

FIG. 3 depicts a FMS 300 according to example embodiments of the present disclosure. As shown, the FMS 300 can include a control display unit (CDU) 310 having a display 312 and one or more input devices 314 (e.g., keyboard). In example embodiments, the CDU 310 can be communicatively coupled to the flight control computer 250. In this way, flight crew members can communicate information to the flight control computer 250 through manipulation of the one or more input devices 314. Likewise, the flight management computer 250 can present information to the flight crew via the display 312 of the CDU 310.

In example embodiments, the FMS 300 can include a navigation database 320 communicatively coupled to the flight management computer 250. The navigation database 320 can include information from which a predicted flight path for the aerial vehicle 100 can be generated. In example embodiments, information stored in the navigation database 320 can include, without limitation, airways and associated waypoints. In particular, an airway can be a predefined path that connects one specified location (e.g., departing airport) to another location (e.g., destination airport). In addition, a waypoint can include one or more intermediate point(s) or place(s) on the predefined path defining the airway.

The FMS 300 can also include a performance database 330 that is communicatively coupled to the flight management computer 250. The performance database 330 can include information that, in combination with information from the navigation database 320, can be used to generate the predicted flight path. In example embodiments, the performance database 330 can include, without limitation, a performance model that can be used to optimize the predicted flight path. More specifically, the performance model can include, without limitation, data indicative of fuel consumption and aerodynamic drag. It should be appreciated that the data can be a function of any suitable value. In one example embodiment, the data can be a function of altitude. Alternatively or additionally, the data can be a function of airspeed of the aerial vehicle 100. Still further, the data can be a function of atmospheric conditions of an environment in which the aerial vehicle 100 is operating.

As shown, example embodiments of the FMS 300 can include an air data computer 340 communicatively coupled to the flight management computer 250. In example embodiments, the air data computer 340 can determine an altitude and/or airspeed of the aerial vehicle 100. More specifically, the altitude and airspeed of the aerial vehicle 100 can be determined based, at least in part, on data received from one or more sensors of the aerial vehicle 100.

Still referring to FIG. 3, the FMS 300 can also include an inertial reference system (IRS) 350 that is communicatively coupled to the flight management computer 250. In example embodiments, the IRS 350 can include a gyroscope, an accelerometer, or both to determine a position, velocity and/or acceleration of the aerial vehicle 100. It should be appreciated that the IRS 350 can include two or more accelerometers. As an example, one example embodiment of the IRS 350 can include two accelerometers and a gyroscope.

Figure 4:
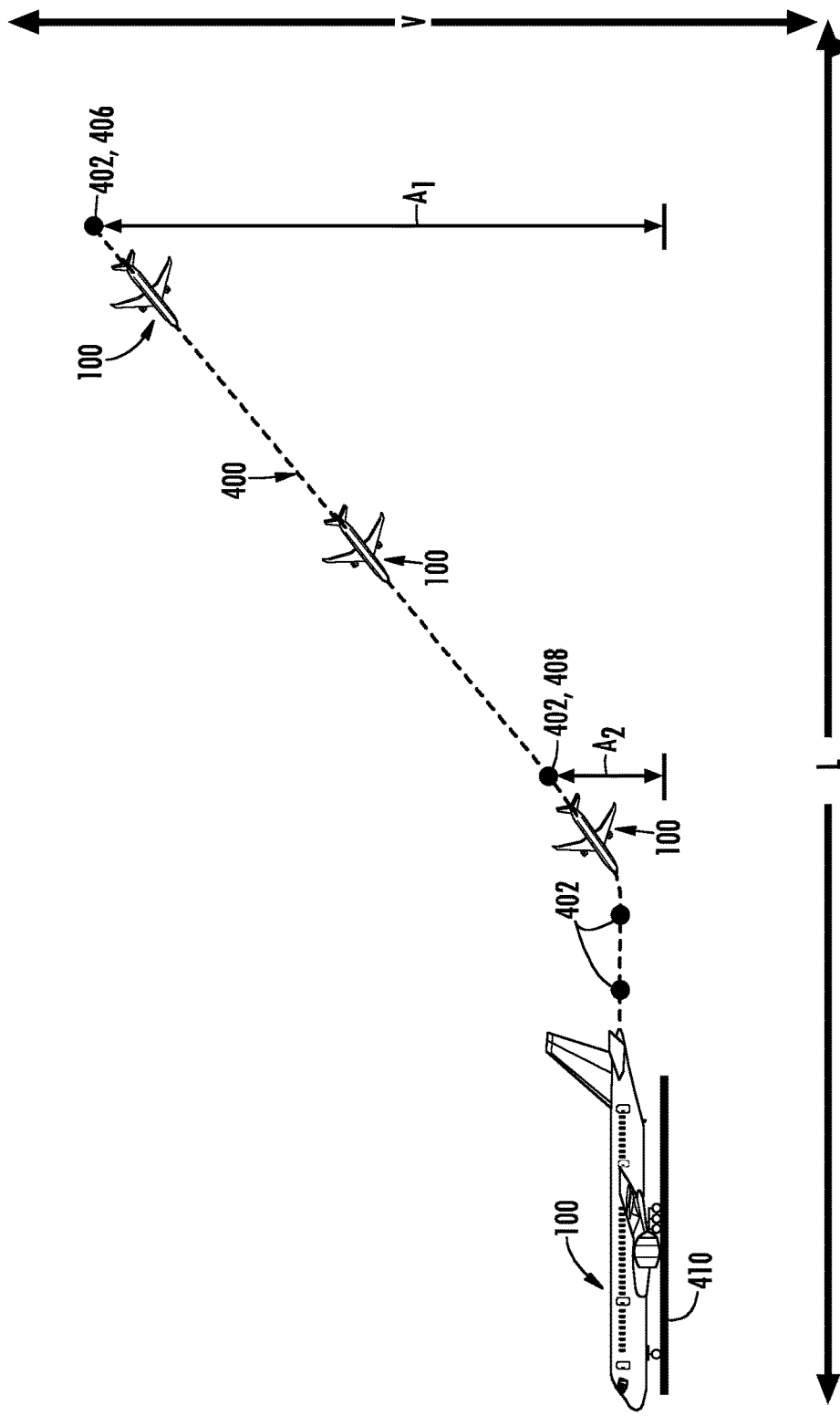
FIG. 4 illustrates a predicted flight path for an aerial vehicle according to example embodiments of the present disclosure.

Referring now to FIG. 4, a predicted flight path 400 for the aerial vehicle 100 operating in an environment (e.g., airway) is depicted according to example embodiments of the present disclosure. As shown, the predicted flight path 400 can include a plurality of waypoints 402 to define the predicted flight path 400. It should be appreciated that the predicted flight path 400 can be generated by the FMS 300 discussed above with reference to FIG. 3. In particular, the flight management computer 250 can generate the predicted flight path 400 based, at least in part, on information received from the control display unit 310, the navigation database 320, the performance database 330, the air data computer 340, the inertial reference system 350, or any suitable combination thereof.

In example embodiments, the predicted flight path 400 can be a four-dimensional trajectory comprising a spatial component and a temporal component. The spatial component can indicate a position of the aerial vehicle 100 within a three-dimensional coordinate system. More specifically, the three-dimensional coordinate system can include a latitude axis (not shown), a longitude axis L, and a vertical axis V. The latitude and longitude axes can indicate a position of the aerial vehicle 100 on a sphere or ellipsoid representative of Earth. The vertical axis V can indicate a distance between the aerial vehicle 100 and a surface of the sphere (e.g., Earth). In addition, a position of each waypoint 402 within the three-dimensional coordinate system can be indicated by a latitude coordinate, a longitude coordinate and an altitude coordinate. In this way, proximity of the aerial vehicle 100 to one or more waypoints 402 can be determined.

The temporal component of the four-dimensional trajectory can indicate when the aerial vehicle 100 can be expected to cross each of the waypoints 402. For example, a first waypoint 406 can be assigned a required time of arrival (RTA) of 16:00:00 PM Greenwich Mean Time (GMT). As such, a temporal component of the first waypoint 406 can indicate the aerial vehicle 100 is expected to cross the first waypoint 406 at 16 PM Greenwich Mean Time (GMT). In addition, a second waypoint 408 that is further along the predicted flight path 400 can be assigned an RTA of 16:30 PM GMT. As such, a temporal component of the second waypoint 408 can indicate the aerial vehicle 100 is expected to cross the second waypoint 408 at 16:30:00 PM GMT. The flight management computer 250 can be configured to control operation of the aerial vehicle 100 to ensure the aerial vehicle 100 crosses the first waypoint 408 at 16:00:00 PM GMT and later cross the second waypoint 408 at 16:30:00 PM GMT.

It should be appreciated, however, that a tolerance can be associated with the RTA for both the first and second waypoints 406, 408. In example embodiments, the tolerance can be programmed into the flight management computer 250. In addition, the tolerance can be equal to any suitable value, such as thirty seconds. As such, the flight management computer 250 can control operation of the aerial vehicle 100 so that the aerial vehicle 100 crosses the first waypoint 406 between 15:59:30 PM GMT and 16:00:30 PM GMT. Likewise, the flight management computer 250 can control operation of the aerial vehicle 100 so that the aerial vehicle 100 crosses the second waypoint 408 between 16:29:30 PM GMT and 16:30:30 PM GMT.

Still referring to FIG. 4, the predicted flight path 400 depicts the aerial vehicle 100 descending to land at a destination 410, such as a runway at an airport. It should be appreciated, however, that the predicted flight path 400 can include other phases of the flight path, such as take-off, climb, and cruise. As shown, the aerial vehicle 100 moves along the longitudinal axis L towards the destination 410 and can simultaneously move (e.g., descend) along the vertical axis V.

In example embodiments, the predicted flight path 400 can include a required navigation performance (RNP) operation in which the aerial vehicle 100 must fly within a corridor (e.g., airspace) that is constrained along the lateral axis, the vertical axis, or both. More specifically, two or more waypoints 402 of the predicted flight path 400 can be assigned a spatial constraint so that the two or more waypoints 402 are positioned within the corridor. As an example, the first waypoint 406 can be assigned a first altitude coordinate $A_1$ within the corridor. In addition, the second waypoint 408 can be assigned a second altitude coordinate $A_2$ that is within the corridor and less than the first altitude coordinate. The flight management computer 250 can be configured to control operation of the aerial vehicle 100 so that the aerial vehicle 100 crosses the first waypoint 406 at the first altitude coordinate $A_1$ and later crosses the second waypoint 408 at the second altitude coordinate $A_2$. In an alternative embodiment, the flight management computer 250 can be configured to control operation of the aerial vehicle 100 so that the aerial vehicle 100 crosses the first waypoint 406 at an altitude that is greater than the first altitude coordinate $A_1$. Likewise, the flight management computer 250 can control operation of the aerial vehicle 100 so that the aerial vehicle 100 crosses the second waypoint 408 at an altitude that is greater than the second altitude coordinate $A_2$. In yet another alternative embodiment, the flight management computer 250 can control operation of the aerial vehicle 100 so that the aerial vehicle 100 crosses the first waypoint 406 at an altitude coordinate that is within a predefined tolerance of the first altitude coordinate $A_1$. Likewise, the flight management computer 250 can control operation of the aerial vehicle 100 so that the aerial vehicle 100 crosses the second waypoint 408 at an altitude that is within a predefined tolerance of the second altitude coordinate $A_2$.

Alternatively or additionally, the first waypoint 406 can be assigned a first latitude coordinate that is within the corridor. In addition, the second waypoint 408 can be assigned a second lateral coordinate that is within the corridor. The flight management computer 250 can be configured to control operation of the aerial vehicle 100 so that the aerial vehicle 100 crosses the first waypoint 406 at the first latitude coordinate and later crosses the second waypoint 408 at the second latitude coordinate. In this way, the flight management computer 250 can ensure the aerial vehicle 100 is within the corridor when the aerial vehicle 100 crosses the first and second waypoints 406, 408.

It should be appreciated that a tolerance can be associated with the corridor defining the RNP operation. In example embodiments, the tolerance can be programmed into the flight management computer 250. In this way, the flight management computer 250 can control operation of the aerial vehicle 100 so that the aerial vehicle 100 crosses the first waypoint 406 within the tolerance assigned to the corridor. Likewise, the flight management computer 250 can control operation of the aerial vehicle 100 so that the aerial vehicle 100 crosses the second waypoint 408 within the tolerance assigned to the corridor. In one example embodiment, the tolerance can be equal to a width of the corridor as defined along the lateral axis of the three-dimensional coordinate system. In particular, the tolerance can be equal to one-tenth of a nautical mile (NM) as measured along the lateral axis.

In example embodiments, the flight management computer 250 can be configured to generate an alarm or notification when the aerial vehicle 100 deviates from the corridor for a predetermined amount of time. In this way, the flight crew can be notified when the aerial vehicle 100 has been operating outside of the corridor for an amount of time that is equal to or greater than the predetermined amount of time.

Figure 5:
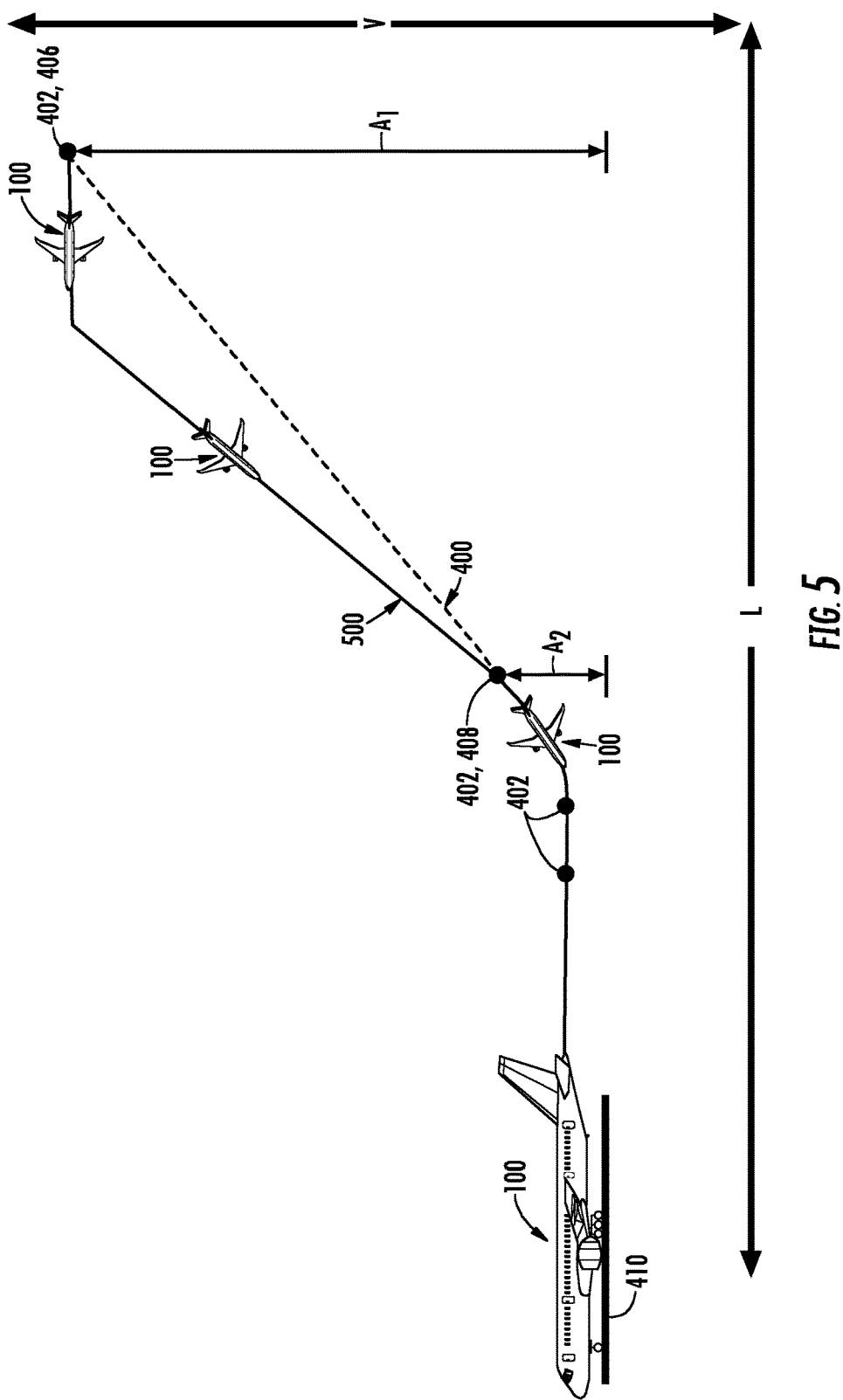
FIG. 5 illustrates an actual flight path for an aerial vehicle according to example embodiments of the present disclosure.

Referring now to FIG. 5, an actual flight path 500 for the aerial vehicle 100 is depicted according to example embodiments of the present disclosure. In example embodiments, the actual flight path 500 can deviate from the predicted flight path 400. As will be discussed below in more detail, uncertainties in one or more intrinsic factors (e.g., the performance model of the aerial vehicle 100) and/or uncertainties in one or more extrinsic factors (e.g., weather conditions) can cause the actual flight path 500 to deviate from the predicted flight path 400.

In one example embodiment, uncertainties in a weather model indicative of weather conditions along the predicted flight path 400 can cause the actual flight path 500 to deviate from the predicted flight path 400. More specifically, uncertainties in wind speed between the first and second waypoints 406, 408 can prevent the aerial vehicle 100 from descending in the manner predicted. Alternatively or additionally, uncertainties in other weather conditions, such as temperature and/or humidity, can cause the aerial vehicle 100 to deviate from the predicted flight path 400.

In another example embodiment, extrinsic factor(s) can include discontinuities (e.g., holding pattern, fly around, etc.) in the actual flight path 500. More specifically, discontinuities in the actual fight path 500 can occur when a ground operator (e.g., air traffic controller) alters the actual flight path 500 to accommodate another aerial vehicle departing (e.g., taking off) from the destination 410. In one example embodiment, a discontinuity in the actual flight path 500 can occur when the ground operator directs the aerial vehicle 100 to fly in a direction that is opposite the destination 410. Alternatively, the ground operator can direct the aerial vehicle 100 to fly around the destination 410 to accommodate another aerial vehicle departing the destination 410. In either instance, however, it should be appreciated that the discontinuities cause the actual flight path 500 to deviate from the predicted flight path 400.

In yet another example embodiment, uncertainties in the performance model of the aerial vehicle 100 can cause the actual flight path 500 to deviate from the predicted flight path 400. More specifically, uncertainties in modeled parameters (e.g., fuel consumption, aerodynamic drag, etc.) indicative of performance of the aerial vehicle 100 can prevent the aerial vehicle 100 from descending between the first waypoint 406 and the second waypoint 408 as predicted.

It should be appreciated that the uncertainties in the intrinsic and extrinsic factor(s) can create an uncertainty or variance in the predicted flight path 400. However, despite the uncertainties in the intrinsic and extrinsic factor(s), the flight management computer 250 can control operation of the aerial vehicle 100 to ensure the actual flight path 500 of the aerial vehicle 100 adheres to RTA and/or spatial constraint(s) assigned to one or more waypoints 402 of the predicted flight path 400. For example, the flight management computer 250 can control operation of the aerial vehicle 100 to ensure the aerial vehicle 100 crosses the first waypoint 406 at the first altitude coordinate $A_1$ and later crosses the second waypoint 408 at the second altitude coordinate $A_2$. In addition, the flight management computer 250 can control operation of the aerial vehicle 100 to ensure the aerial vehicle 100 crosses the first waypoint 406 at 16:00:00 PM GMT and later crosses the second waypoint 408 at 16:30:00 PM GMT. In this way, uncertainty in the predicted flight path 400 at the first waypoint 406 and the second waypoint 408 can be greatly reduced or eliminated. However, as illustrated in FIG. 5, the aerial vehicle 100 can deviate from the predicted flight path 400 between the first and second waypoint 406, 408. In particular, the aerial vehicle 100 can cross one or more waypoints positioned between the first and second waypoints 406, 408 earlier or later than predicted. In this way, there can be uncertainty in the temporal component for the one or more waypoints positioned between the first and second waypoints 406, 408. As will be discussed below in more detail, the flight management computer 250 can be configured to determine the uncertainty or variance in the predicted flight path 400 based, at least in part, on uncertainties in the intrinsic factor(s), the extrinsic factor(s), or both.

In example embodiments, the flight management computer 250 can receive first data comprising actual values for one or more parameters (e.g., fuel consumption, aerodynamic drag, etc.) indicative of actual performance of the aerial vehicle 100. More specifically, the flight management computer 250 can receive the first data from one or more sensors of the aerial vehicle 100. In one example embodiment, the first data can indicate, without limitation, actual fuel consumption of the aerial vehicle 100. Additionally or alternatively, the first data can indicate a drag force acting on the aerial vehicle 100. In example embodiments, the flight management computer 250 can be configured to compare the first data (that is, the actual values indicative of actual performance) to the performance model. In this way, the flight management computer 250 can determine uncertainty or variance in the performance model used to generate the predicted flight path 400.

In addition, the flight management computer 250 can receive second data indicative of actual weather conditions for the environment in which the aerial vehicle 100 is operating. In one example embodiment, the second data can include, without limitation, temperature, humidity, and wind speed. The flight management computer 250 can receive the second data from one or more sensors of the aerial vehicle 100. In addition, the flight management computer 250 can be configured to compare the second data to the weather model indicative of weather conditions (e.g., temperature, humidity, wind speed) of the environment in which the aerial vehicle 100 is operating. In this way, the flight management computer 250 can be configured to determine uncertainty or variance in the weather model used to generate the predicted flight path 400.

In one example embodiment, the weather model can include data indicative of weather conditions at the first waypoint 406 and the second waypoint 408 of the predicted flight path 400. In addition, the flight management computer 250 can be configured to estimate weather conditions between the first waypoint 406 and the second waypoint 408. More specifically, the flight management computer 250 can interpolate between weather conditions (e.g., temperature, humidity, wind speed) at the first waypoint 406 and weather conditions at the second waypoint 408 to determine weather conditions between the first and second waypoints 406, 408. It should be appreciated that the number of waypoints 402 included within the predicted flight path 400 can affect the uncertainty in the weather model. More specifically, increasing the number of waypoints 402 included in the predicted flight path 400 generally shortens the distance between two adjacent waypoints 402. In this way, the uncertainty in determining weather conditions between two adjacent waypoints 402 can be reduced, because weather conditions are less likely to vary over the shortened distance.

In example embodiments, the flight management computer 250 can be configured to determine the uncertainty or variance in the predicted flight path 400 based on uncertainty in performance model and uncertainty in the weather model. More specifically, the flight management computer 250 can be configured to determine uncertainty or variance in one or more spatial components of the predicted flight path 400. Alternatively or additionally, the flight management computer 250 can be configured to determine uncertainty or variance in the temporal component of the predicted flight path 400.

In example embodiments, the spatial component can include a first value, a second value and a third value. More specifically, the first value can indicate a position along the latitude axis L of the three-dimensional coordinate system. In addition, the second value can indicate a position along the longitudinal axis of the three-dimensional coordinate system. Still further, the third value can indicate a position along the vertical axis V of the three-dimensional coordinate system. As such, the spatial component can include a latitude coordinate (e.g., the first value), a longitude coordinate (e.g., the second value), and an altitude coordinate (e.g., the third value). In this way, the flight management computer 250 can be configured to determine uncertainty or variance in the first value, the second value and the third value based, at least in part, on the uncertainty in the performance model and the uncertainty in the weather model.

In example embodiments, the uncertainty in the predicted flight path 400 can be quantified by a confidence score. The confidence score can be indicative of the likelihood of the aerial vehicle 100 flying the predicted flight path 400. It should be appreciated that the confidence score can be any suitable value. For example, the confidence score can be a percentage value between zero (0) and one hundred (100). More specifically, a confidence score of zero can indicate that the aerial vehicle 100 cannot fly the predicted flight path 400. Alternatively, a confidence score of one hundred can indicate that the aerial vehicle 100 can fly the predicted flight path 400.

As depicted in FIG. 5, the aerial vehicle 100 cannot fly the predicted flight path 400 when the aerial vehicle 100 is positioned between the first waypoint 406 and the second waypoint 408. As such, the confidence score must be less than one hundred (100) when the aerial vehicle 100 is positioned between the first waypoint 406 and the second waypoint 408. Alternatively, the aerial vehicle 100 can fly the predicted flight path 400 when the aerial vehicle is positioned between the second waypoint 408 and the destination 410. As such, the confidence score must be equal to one hundred when the aerial vehicle 100 is positioned between the second waypoint 408 and the destination 410.

As mentioned above, the flight management computer 250 can control operation of the aerial vehicle 100 so that the actual flight path 500 of the aerial vehicle 100 adheres to a RTA constraint assigned to one or more waypoints 402 of the predicted flight path 400, such as the first and second waypoints 406, 408. In this way, a confidence score for the first waypoint 406 can be equal to 100. Likewise, a confidence score for the second waypoint 408 can be equal to 100.

Alternatively or additionally, the flight management computer 250 can be configured to generate a notification indicative of the uncertainty or variance in the predicted flight path 400. In one example embodiment, the flight management computer 250 can present the notification on a feedback device. More specifically, the display device can be one of the flight displays 146 (FIG. 1) located in the cockpit 140 of the aerial vehicle 100. Alternatively or additionally, the feedback device can be located at a ground station, such as an air traffic control (ATC) tower. In this way, one or more air traffic controllers viewing the feedback device can determine an optimal flight path for one or more aerial vehicles based, at least in part, on the uncertainty in the predicted flight path 400. It should be appreciated that the uncertainty in the predicted flight path 400 can be indicative of uncertainty in the current position of the aerial vehicle 100 relative to the predicted flight path 400. In other words, how much, if any, the current position of the aerial vehicle 100 deviates from the predicted flight path 400. Alternatively or additionally, the uncertainty in the predicted flight path 400 can be indicative of uncertainty in a future position of the aerial vehicle 100 relative to the predicted flight path 400. In other words, how much, if any, the future position of the aerial vehicle 100 can deviate from the predicted flight path 400.

Figure 6:
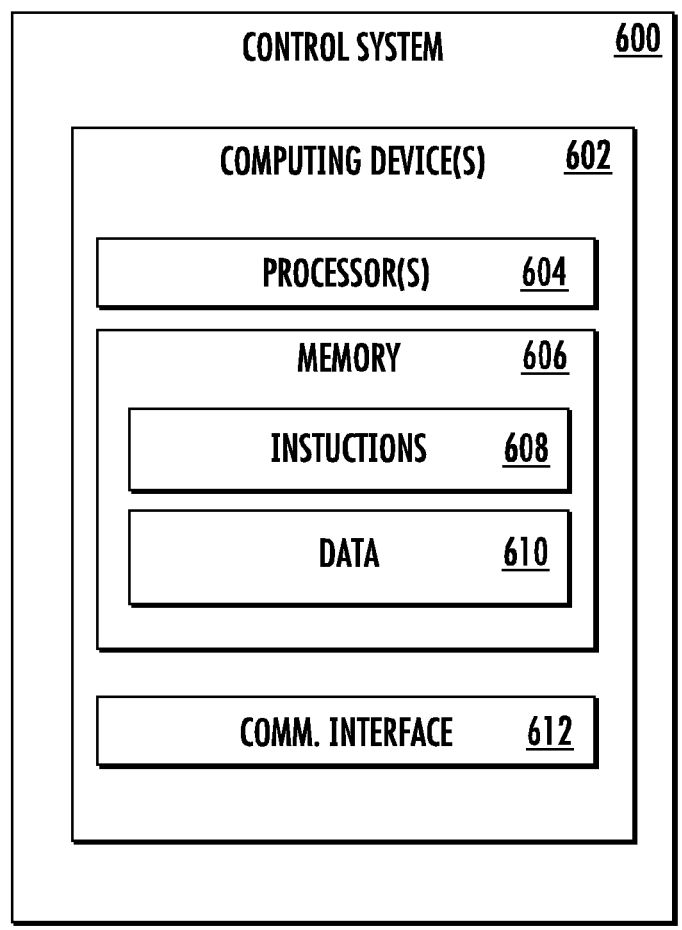
FIG. 6 illustrates a computing device for implementing one or more aspects according to example embodiments of the present disclosure.

FIG. 6 depicts a block diagram of an example system 600 that can be used to implement methods and systems according to example embodiments of the present disclosure. As shown, the system 600 can include one or more computing device(s) 602. The one or more computing device(s) 602 can include one or more processor(s) 604 and one or more memory device(s) 606. The one or more processor(s) 604 can include any suitable processing device, such as a microprocessor, microcontroller, integrated circuit, logic device, or other suitable processing device. The one or more memory device(s) 606 can include one or more computer-readable media, including, but not limited to, non-transitory computer-readable media, RAM, ROM, hard drives, flash drives, or other memory devices.

The one or more memory device(s) 606 can store information accessible by the one or more processor(s) 604, including computer-readable instructions 608 that can be executed by the one or more processor(s) 604. The computer-readable instructions 608 can be any set of instructions that when executed by the one or more processor(s) 604, cause the one or more processor(s) 604 to perform operations. The computer-readable instructions 608 can be software written in any suitable programming language or can be implemented in hardware. In some embodiments, the computer-readable instructions 608 can be executed by the one or more processor(s) 604 to cause the one or more processor(s) 604 to perform operations, such as determining uncertainty in the predicted flight path 400, as described below with reference to FIG. 7. In some embodiments, the computer-readable instructions 608 can be executed by the one or more processor(s) 604 to cause the one or more processor(s) to perform flight management system (FMS) operations.

The memory device(s) 606 can further store data 610 that can be accessed by the one or more processor(s) 604. For example, the data 610 can include any data used for predicting a flight path, as described herein. The data 610 can include one or more table(s), function(s), algorithm(s), model(s), equation(s), etc. for predicting a flight path according to example embodiments of the present disclosure.

The one or more computing device(s) 602 can also include a communication interface 612 used to communicate, for example, with the other components of system. The communication interface 612 can include any suitable components for interfacing with one or more network(s), including for example, transmitters, receivers, ports, controllers, antennas, or other suitable components.

Figure 7:
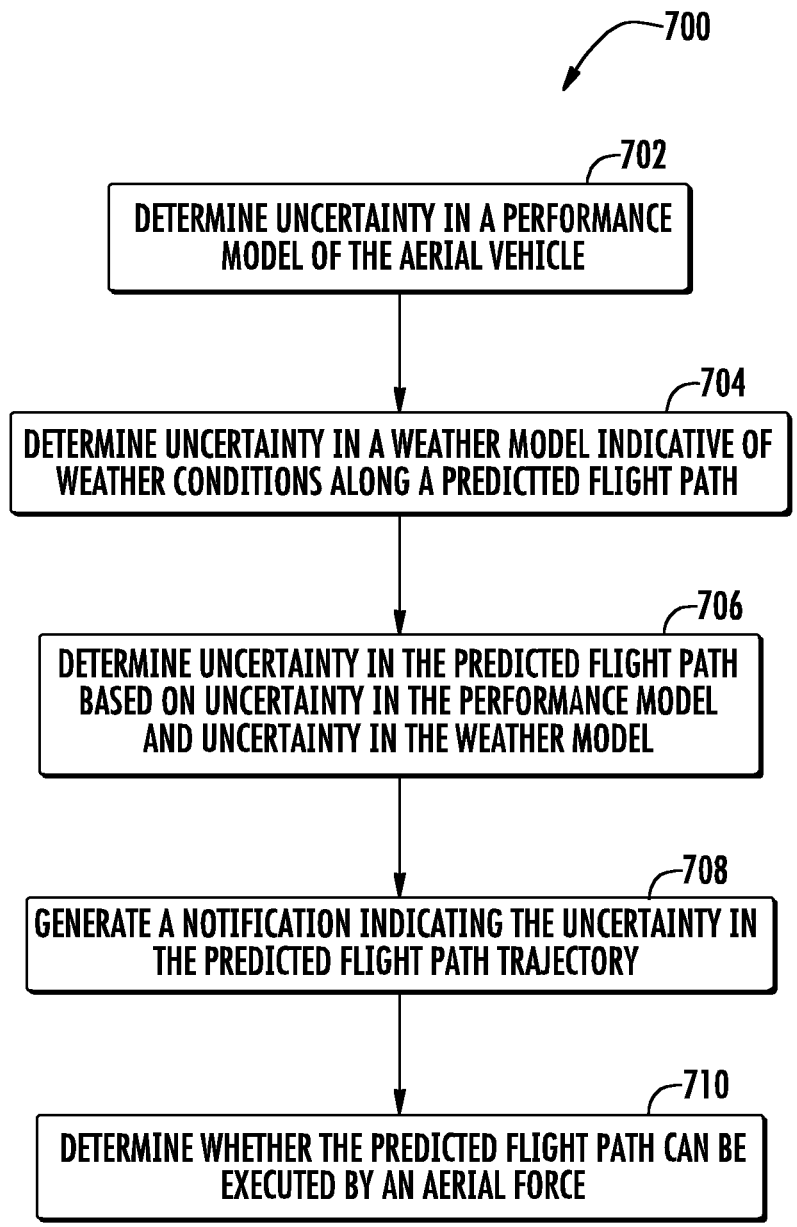
FIG. 7 illustrates a flow diagram of an example method for determining uncertainty in a predicted flight path according to example embodiments of the present disclosure.

FIG. 7 depicts a flow diagram of an example method 700 for determining uncertainty in a predicted flight path for an aerial vehicle. The method 700 can be implemented using, for instance, the control system 600 of FIG. 6. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, performed simultaneously or modified in various ways without deviating from the scope of the present disclosure.

At (702), the method 700 can include determining, by one or more computing devices, uncertainty in a performance model of the aerial vehicle. Specifically, in example embodiments, the performance model can be stored within the performance database discussed above with reference to FIG. 3. More specifically, the performance model can include, without limitation, a drag profile specific, at least in part, to the fuselage of the aerial vehicle. Alternatively or additionally, the performance model can include data indicative of fuel consumption.

At (704), the method 700 can include determining, by the one or more computing devices, uncertainty in a weather model indicative of weather conditions along the predicted flight path. Specifically, in one example embodiment, the weather model can include, without limitation, data indicative of temperature, humidity, and wind speed at various locations along the predicted flight path.

At (706), the method 700 can include calculating, by the one or more computing devices, uncertainty in the predicted flight path based, at least in part, on uncertainty in the performance model determined at (702) and uncertainty in the weather model determined at (704). Specifically, in one example embodiment, the one or more computing devices can determine uncertainty in one or more spatial components of the predicted flight path. In particular, the one or more spatial components can each include a latitude coordinate, a longitude coordinate and an altitude coordinate. In this way, the one or more computing devices can determine uncertainty in the latitude coordinate, the longitude coordinate and the altitude coordinate. Alternatively or additionally, the one or more computing devices can determine uncertainty in a temporal component of the predicted flight path.

At (708), the method 700 can include generating, by the one or more computing devices, a notification indicating the determined uncertainty in the predicted flight path. Specifically, in example embodiments, the notification can be presented on a feedback device. In particular, the feedback device can be positioned within a cockpit of the aerial vehicle. Alternatively or additionally, the feedback device can be positioned at a ground station (e.g., air traffic control tower). In this way, the flight crew members and/or air traffic controllers can determine a likelihood of the aerial vehicle flying the predicted flight path generated by the flight management computer.

At (710), the method 700 can include determining, by the one or more computing devices, whether the aerial vehicle can execute the predicted flight path. Specifically, in example embodiments, the one or more computing devices can be located at a ground station (e.g., air traffic control tower). In addition, the uncertainty in the predicted flight path can be a confidence score indicative of a likelihood of the aerial vehicle flying the predicted flight path. When the confidence score is greater than the threshold value, the one or more computing devices can be configured to determine the aerial vehicle cannot execute (e.g., fly) the predicted flight path. Furthermore, when the one or more computing devices determine at (710) that the aerial vehicle cannot execute the predicted flight path, it should be appreciated that the one or more computing devices can update the predicted flight path to include a lateral discontinuity (e.g., deviation from the predicted flight path along the lateral axis). Alternatively or additionally, the one or more computing devices can update the predicted flight path to include a vertical discontinuity (e.g., deviation from the predicted flight path along the vertical axis). In addition, once the aerial vehicle executes (e.g., flies past) the lateral discontinuity and/or vertical discontinuity, the FMS can prompt the flight crew to select a guidance mode. In this way, the flight crew can determine how the aerial vehicle should be operated when the FMS determines the aerial vehicle cannot execute (e.g., fly) the predicted flight path.

Alternatively, when the confidence score is less than the threshold value, the one or more computing devices can be configured to determine the aerial vehicle can execute the predicted flight path. When the confidence score is equal to the threshold value, the one or more computing devices can be configured to determine the aerial vehicle either can or cannot execute the predicted flight path.

Although specific features of various embodiments may be shown in some drawings and not in others, this is for convenience only. In accordance with the principles of the present disclosure, any feature of a drawing may be referenced and/or claimed in combination with any feature of any other drawing.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

This written description uses examples to disclose example embodiments of the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for determining uncertainty in a predicted flight path for an aerial vehicle, wherein the predicted flight path is comprised of a temporal component and a spatial component, the method comprising:

receiving, by one or more computing devices, a first data set comprising one or more parameters indicative of actual performance of the aerial vehicle from one or more sensors of the aerial vehicle;

comparing, by the one or more computing devices, the one or more received parameters of the first data set to one or more corresponding predicted parameters of a performance model of the aerial vehicle;

determining, by the one or more computing devices, uncertainty in the performance model of the aerial vehicle based at least in part on a variance between the one or more received parameters of the first data set and the one or more corresponding predicted parameters of the performance model;

receiving, by the one or more computing devices, a second data set comprising one or more parameters indicative of actual weather conditions for an environment in which the aerial vehicle is operating from the one or more sensors of the aerial vehicle;

comparing, by the one or more computing devices, the one or more received parameters of the second data set to one or more corresponding predicted parameters of a weather model of the aerial vehicle;

determining, by the one or more computing devices, uncertainty in the weather model indicative of weather conditions along the predicted flight path based at least in part on a variance between the one or more received parameters of the second data set and the one or more corresponding predicted parameters of the weather model;

determining, by the one or more computing devices, uncertainty in the predicted flight path based on the uncertainty in the performance model and the uncertainty in the weather model, wherein determining, by the one or more computing devices, uncertainty in the predicted flight path based on the uncertainty in the performance model and the uncertainty in the weather model comprises determining a confidence score indicative of a likelihood of the aerial vehicle flying the predicted flight path within constraints of the temporal component and the spatial component of the predicted flight path; and generating, by the one or more computing devices, a notification indicating the uncertainty in the predicted flight path.

2. The method of claim 1, further comprising determining, by the one or more computing devices, the predicted flight path cannot be executed when the uncertainty in the predicted flight path is greater than a threshold value.

3. The method of claim 1, further comprising:
receiving a required time of arrival for a waypoint along the predicted flight path, wherein the required time of arrival for the waypoint is indicative of a time in which the aerial vehicle is predicted to arrive at the waypoint;
receiving a required navigation performance operation indicative of an airspace in which the aerial vehicle is constrained, and
wherein the confidence score quantifies the likelihood of the aerial vehicle flying the predicted flight path within the received required time of arrival for the waypoint while remaining within the airspace in which the aerial vehicle is constrained as indicated by the received required navigation performance operation.

4. The method of claim 1, wherein the confidence score is quantified as a percentage.

5. The method of claim 1, wherein determining the uncertainty in the predicted flight path comprises determining, by the one or more computing devices, uncertainty in the temporal component based on the uncertainty in the performance model and the uncertainty in the weather model.

6. The method of claim 5, wherein determining the uncertainty in the predicted flight path comprises determining, by the one or more computing devices, uncertainty in the spatial component based on the uncertainty in the performance model and the uncertainty in the weather model.

7. The method of claim 6, wherein the spatial component comprises a first value, a second value and a third value, and wherein each of the first, second and third values indicate a position along one axis of a three-dimensional coordinate system comprising a lateral axis, a longitudinal axis, and a vertical axis.

8. The method of claim 7, wherein determining the uncertainty in the spatial component further comprises:
determining, by the one or more computing devices, uncertainty in the first value of the spatial component based on the uncertainty in the performance model and the uncertainty in the weather model;

determining, by the one or more computing devices, uncertainty in the second value of the spatial component based on the uncertainty in the performance model and the uncertainty in the weather model; and determining, by the one or more computing devices, uncertainty in the third value of the spatial component based on the uncertainty in the performance model and the uncertainty in the weather model.

9. A system for determining uncertainty in a predicted flight path for an aerial vehicle, wherein the predicted flight path is comprised of a temporal component and a spatial component, the system comprising:
one or more sensors positioned onboard the aerial vehicle;
one or more computing devices comprising one or more memory devices and one or more processing devices, the one or more memory devices storing computer-readable instructions that can be executed by the one or more processing devices to perform operations, the operations comprising:
receiving a first data set comprising one or more parameters indicative of actual performance of the aerial vehicle from the one or more sensors onboard the aerial vehicle;
comparing the one or more received parameters of the first data set to one or more corresponding predicted parameters of a performance model of the aerial vehicle;
determining uncertainty in the performance model of the aerial vehicle based at least in part on a variance between the one or more received parameters of the first data set and the one or more corresponding predicted parameters of the performance model;
receiving a second data set comprising one or more parameters indicative of actual weather conditions for an environment in which the aerial vehicle is operating from the one or more sensors of the aerial vehicle;
comparing the one or more received parameters of the second data set to one or more corresponding predicted parameters of a weather model of the aerial vehicle;
determining uncertainty in the weather model indicative of weather conditions along the predicted flight path based at least in part on a variance between the one or more received parameters of the second data set and the one or more corresponding predicted parameters of the weather model;
determining uncertainty in the predicted flight path based on the uncertainty in the performance model and the uncertainty in the weather model, wherein determining, by the one or more computing devices, uncertainty in the predicted flight path based on the uncertainty in the performance model and the uncertainty in the weather model comprises determining a confidence score indicative of a likelihood of the aerial vehicle flying the predicted flight path within constraints of the temporal component and the spatial component of the predicted flight path; and
generating a notification indicating the uncertainty in the predicted flight path, wherein the uncertainty is indicated by the confidence score.

10. The system of claim 9, wherein the one or more parameters indicative of actual performance of the aerial vehicle include an aerodynamic drag on the aerial vehicle.

11. The system of claim 9, wherein the operations further comprise:

transmitting the notification indicating the uncertainty in the predicted flight path to a remote computing system comprising one or more memory devices and one or more processing devices, the one or more memory devices of the remote computing system storing computer-readable instructions that can be executed by the one or more processing devices of the remote computing system to perform operations, wherein the operations performed by the one or more processing devices of the remote computing system comprise:

determining, based on the confidence score of the transmitted notification, whether the aerial vehicle is at risk of interfering with a predicted flight path for one or more aerial vehicles operating within a predetermined proximity of the aerial vehicle.

12. The system of claim 9, wherein the one or more computing devices are further configured to determine uncertainty in the temporal component based on the uncertainty in the performance model and the uncertainty in the weather model.

13. The system of claim 12, wherein the one or more computing devices are further configured to determine uncertainty in the spatial component based on the uncertainty in the performance model and the uncertainty in the weather model.

14. The system of claim 13, wherein the spatial component comprises a first value, a second value and a third value, and wherein each of the first, second and third values indicate a position of the aerial vehicle along one axis of a three dimensional coordinate system comprising a lateral axis, a longitudinal axis, and a vertical axis.

15. The system of claim 14, wherein the one or more computing devices are further configured to:

determine uncertainty in the first value of the spatial component based on the uncertainty in the performance model and the uncertainty in the weather model;

determine uncertainty in the second value of the spatial component based on the uncertainty in the performance model and the uncertainty in the weather model; and determine uncertainty in the third value of the spatial component based on the uncertainty in the performance model and the uncertainty in the weather model.

16. The system of claim 9, wherein the one or more computing devices are further configured to present the notification on a feedback device.

17. The system of claim 9, wherein the one or more computing devices are further configured to determine the predicted flight path cannot be executed when the uncertainty in the predicted flight path is greater than a threshold value.

18. An aerial vehicle comprising:
one or more sensors;
one or more computing devices comprising one or more memory devices and one or more processing devices, the one or more memory devices storing computer-readable instructions that can be executed by the one or more processing devices to perform operations, the operations comprising:

receiving a first data set comprising one or more parameters indicative of actual performance of the aerial vehicle from the one or more sensors onboard the aerial vehicle;

comparing the one or more received parameters of the first data set to one or more corresponding predicted parameters of a performance model of the aerial vehicle;

determining uncertainty in the performance model of the aerial vehicle based at least in part on a variance between the one or more received parameters of the first data set and the one or more corresponding predicted parameters of the performance model;

receiving a second data set comprising one or more parameters indicative of actual weather conditions for an environment in which the aerial vehicle is operating from the one or more sensors of the aerial vehicle;

comparing the one or more received parameters of the second data set to one or more corresponding predicted parameters of a weather model of the aerial vehicle;

determining uncertainty in the weather model indicative of weather conditions along the predicted flight path based at least in part on a variance between the one or more received parameters of the second data set and the one or more corresponding predicted parameters of the weather model;

determining uncertainty in the predicted flight path based on the uncertainty in the performance model and the uncertainty in the weather model, wherein determining, by the one or more computing devices, uncertainty in the predicted flight path based on the uncertainty in the performance model and the uncertainty in the weather model comprises determining a confidence score indicative of a likelihood of the aerial vehicle flying the predicted flight path; and generating a notification indicating the uncertainty in the predicted flight path.

19. The aerial vehicle of claim 18, wherein the predicted flight path comprises a temporal component and a spatial component.

20. The aerial vehicle of claim 18, wherein the one or more computing devices are further configured to determine the predicted flight path cannot be executed when the uncertainty in the predicted flight path is greater than a threshold value.

* * * * *